United States Patent [19]

Shaer

[11] Patent Number: 5,524,953

[45] Date of Patent: Jun. 11, 1996

[54] CONTRACTABLE VEHICLE BED COVER ASSEMBLY WITH EXTENDABLE CLOSURE

[76] Inventor: Jack E. Shaer, 2212 Rolling Ridge, Lindenhurst, Ill. 60060

[21] Appl. No.: 253,336

[22] Filed: Jun. 3, 1994

[51] Int. Cl.⁶ ........................................... B60P 7/04
[52] U.S. Cl. ........................................... 296/100; 296/101
[58] Field of Search ................................ 296/100, 101

[56] References Cited

U.S. PATENT DOCUMENTS

| | | | |
|---|---|---|---|
| 3,910,629 | 10/1975 | Woodward | 296/137 B |
| 4,518,194 | 5/1985 | Kirkham et al. | 296/100 |
| 4,740,029 | 4/1988 | Tuerk | 296/100 |
| 4,795,206 | 1/1989 | Adams | 296/98 |
| 4,938,523 | 7/1990 | Camp | 296/159 |

FOREIGN PATENT DOCUMENTS

| | | | |
|---|---|---|---|
| 165113 | 12/1985 | European Pat. Off. | 296/100 |
| 273740 | 7/1988 | European Pat. Off. | 296/100 |
| 1372826 | 10/1963 | France | 296/100 |
| 2653478 | 4/1991 | France | 296/100 |
| 3340063 | 5/1985 | Germany | 296/100 |
| 3723452 | 2/1989 | Germany | 296/100 |
| 182537 | 11/1982 | Japan | 296/100 |
| 1384419 | 3/1988 | U.S.S.R. | 296/100 |

*Primary Examiner*—Joseph D. Pape
*Attorney, Agent, or Firm*—James P. Hanrath

[57] ABSTRACT

A contractible cover assembly for the load carrying body of a vehicle includes canopy frame cover structure mounted upon a plurality of drive train team members longitudinally moveable along laterally spaced guide track rails to extend or retract the canopy frame cover structure from an open stored position wherein the truck bed is substantially uncovered and the closed covering position wherein the truck bed is closed by the canopy frame cover structure. The laterally spaced guide rails may be mounted along the longitudinal side surface of a vehicle bed or the vertically extending sidewall portions of a vehicle bed for supporting the drive train team members during movement thereon. The canopy frame cover structure includes canopy frames having a rib portion integral with and bridging a pair of support legs, the rib portion having a length sufficient to extend traversely across the width of the vehicle cargo bed and the support legs being attached to and supported by the plurality of drive train members. Drive wheels, operatively connected with a power source and cooperative with a drive cable to provide a selected and synchronized longitudinal movement of the drive train members along the guide rails for moving the canopy frame cover structure between the open storage position and closed covering position. An closure end train member includes a lock plate operatively connected to an extensible canopy support arm which is interconnected to a trip wheel by a lever arm. The lock plate is cooperative with a rail stop to either lock or free a lock pin cooperative with the trip wheel to thereby control rotational movement of the trip wheel, which rotational movement extends or retracts an end portion of the canopy frame cover structure to thereby enclose an end portion of the vehicle bed.

12 Claims, 11 Drawing Sheets

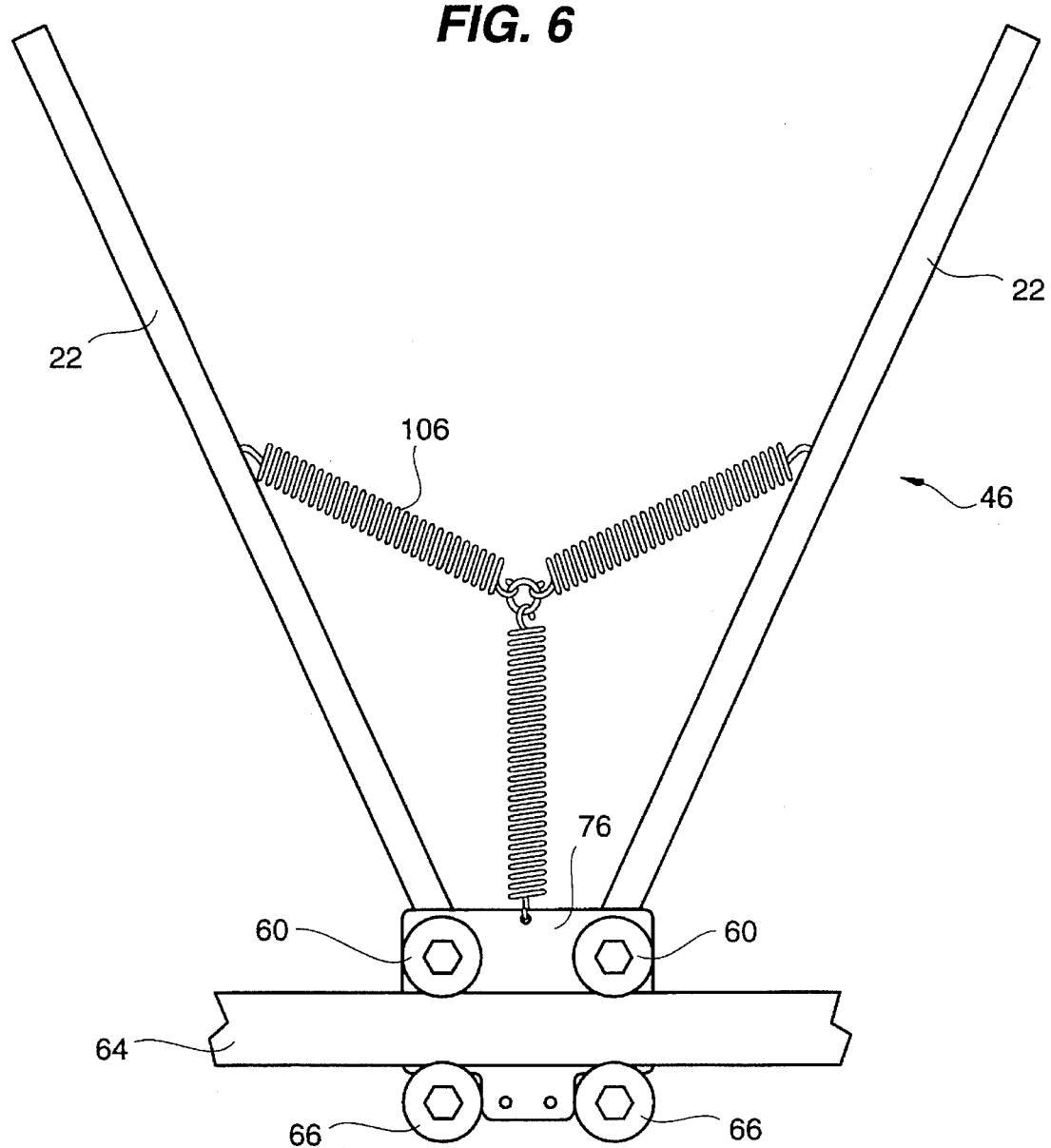

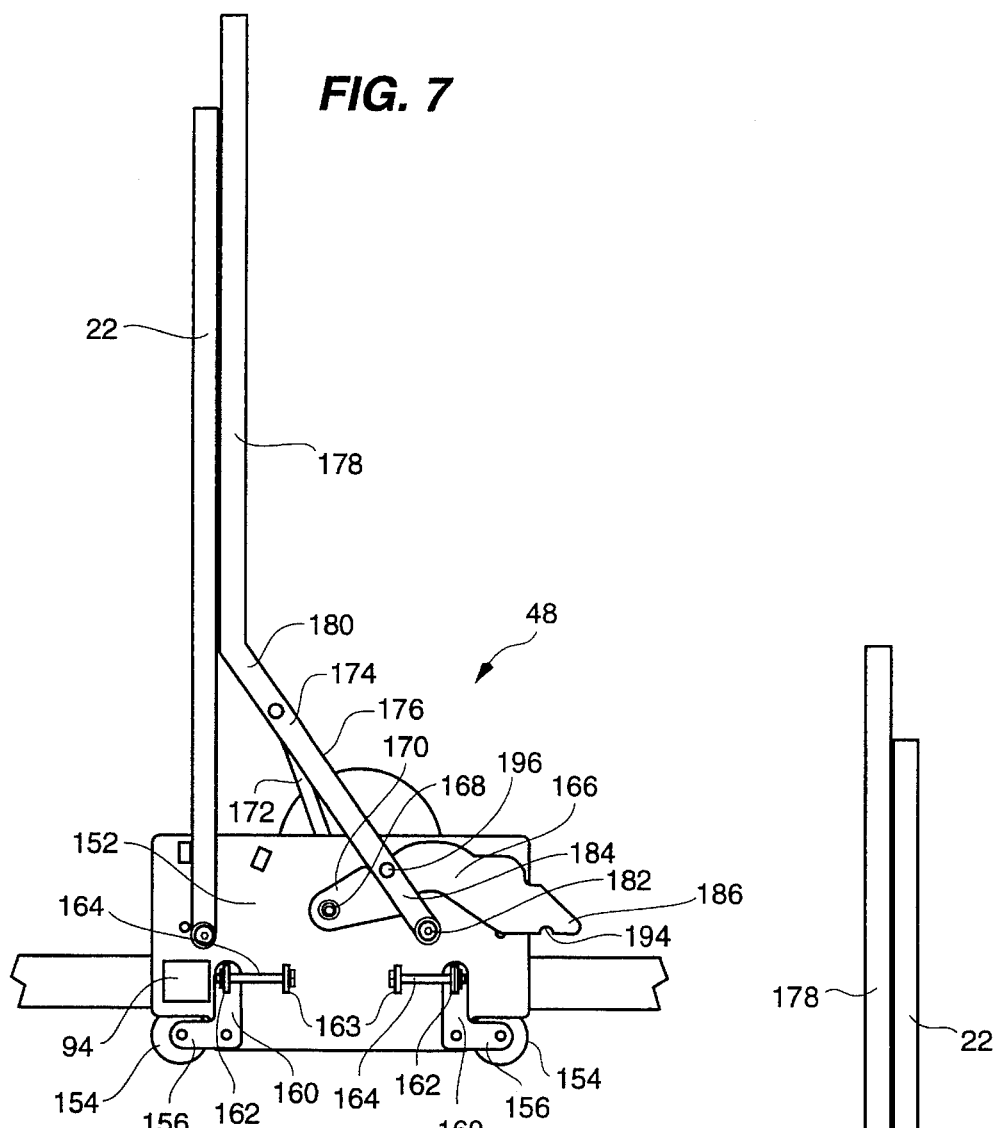
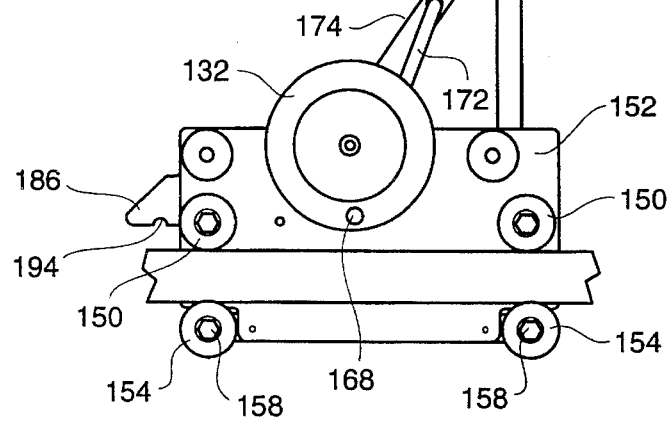

5,524,953

CONTRACTABLE VEHICLE BED COVER ASSEMBLY WITH EXTENDABLE CLOSURE

BACKGROUND OF THE INVENTION

1. Field of the Invention

The present invention relates to a new and useful improvement in covers or tarpaulins for open truck or vehicle bodies, and more specifically pertains to an extendable and contractible vehicle bed covering with an extendable closure to completely enclose a vehicle bed.

2. Description of the related art including information disclosed under 37 CFR §1.97–1.99

In the prior art, various attempts have been made to provide an automated, weather and theft resistant, or load bearing vehicle cover. The necessity for these covers has resulted in part from governmental regulations that require trucks hauling materials such as sand, gravel, landfill and refuse to have the top of the open body of the truck covered with a covering or tarpaulin and from the necessity to secure cargo to prevent dangerous spillage.

In the past, truckers have had to carry a tarpaulin in a convenient location and when the truck is loaded, it is necessary to manually spread the tarpaulin over the load which may be a time consuming or even a hazardous process. Recent developments have produced some devices that mechanically extend and retract a tarpaulin in the operation of covering the open body of a truck. For example, in U.S. Pat. No. 4,795,206 to Adams there is disclosed a cover system for a pickup truck that has an open top defined by vertical spaced apart side walls, and a front wall. The cover system includes a rollable cover unit which has the capability of being either completely or partially extended or retracted to close or expose the truck bed. The cover portion consists of a multiplicity of adjacent transverse rigid panels which are continuously connected along their transverse length by flexible resilient connecting strip members of flexible and water resistant material. The cover unit is extended or retracted by a drive system located at the upper forward section of the truck bed. The drive system includes one or more pinion type cylindrical drive roller members intermediate the side walls of the truck bed which are in driving contact with and have teeth to positively engage rack-type teeth on the underside of the cover panels. Controls and motor means are provided to control and activate the drive system. A power driven reeling system is provided adjacent to the drive system and connected to the cover unit so that movement of the reeling system will also assist the cover unit to be extended or retracted. The reeling system is linked in a coordinated manner with the drive roller members. In one embodiment, when the tailgate of the truck is removed or absent, the rear opening of the truck bed will be covered by driving the cover unit to the floor at the rear of the truck bed. A disadvantage of this covering system is that it is adapted for a pickup-type truck having an elongated truck bed with a horizontal truck bed floor portion and a pair of laterally spaced parallel vertically extending side wall portions. The guide and support track means of this system are placed at the interior side of the pair of laterally spaced apart parallel vertically extending side wall portions of the pickup-type truck and thus, the system is not adaptable to a pure flat-bed type truck or trailer. Still further, the covering comprises a segmented load bearing cover which may add substantial weight and complexity as opposed to embodying foldable and relatively light weight material as a non-load bearing cover which is yet suitable to protect against adverse weather and environmental conditions.

In U.S. Pat. No. 4,518,194 to Kirkum there is disclosed an automatic cover assembly for an open top pickup truck consisting of a series of travelling rectangular frames covered with a sheet of flexible material. The frames are stored in accordion folds in a box located at the front of the truck. Motor means are provided to drive and control the movement of the frames and cover sheet in the manner of a rack and pinion drive. However, this reference does not disclose means for extending and driving the cover to the floor of the truck bed such as to completely enclose the truck bed cargo area.

In U.S. Pat. No. 4,938,523 to Camp there is disclosed a contractible tent shell truck cover which is slidably secured within spaced parallel rails secured interiorly of a truck bed. The truck cover is contractible in an accordion style fashion to compress against the forwardmost wall of the truck bed. Spaced first and second lengths secure "U" shaped rails wherein third and fourth lengths are secured between the rails at the apex of each downwardly orientated "U" shaped rail to provide rigidity to a skeleton framework securing thereto a flexible canopy. The canopy and framework is removably attached to the spaced rails and a floor panel is secured to lowermost edges of the canopy by a zipper connection including a second door panel replaceable for the first door panel to provide a tent structure when the cover is removed from the truck bed. Such a contractible truck cover system is again particularly suited for a pickup-type truck having a pair of laterally spaced parallel vertically extending side wall portions as opposed to a mere flat-bed type truck bed floor portion. Still further, this contractible truck cover system does not disclose means for extending and driving the cover to completely enclose the truck bed.

In U.S. Pat. No. 3,910,629 to Woodward there is disclosed a telescopic cover for the load-carrying body of a truck comprised of a plurality of cover sections which are adapted to be moved from a retracted or open disposition to an extended or closed disposition relative to the open top of the load-carrying body. Motor activated cables are employed to selectively move the telescopic cover to the retracted or extended positions. Again, such a system is adapted for the top of a load-carrying body and does not have means for enclosing the entire truck bed.

As will be described in greater detail hereinafter, the present invention provides for a contractible cover assembly for the load carrying body of a vehicle comprising:

canopy frame cover means for covering a load carrying body of a vehicle bed which is movable from an open storage position wherein the vehicle bed is substantially uncovered and a closed covering position wherein the vehicle bed is closed by the cover means;

laterally spaced guide track means capable of being mounted along the longitudinal side surfaces of a vehicle bed or the vertically extending side wall portions bordering a vehicle bed for supporting said cover means during movement between said open storage position and said closed covering position;

said canopy frame cover means including a plurality of drive train members longitudinally moveable along said guide track means and a plurality of canopy frames, said frames having a rib portion integral with and bridging a pair of support legs, said rib portion having a length to extend traversely across the width of said load carrying body of a vehicle bed between said laterally spaced guide track means, and said support legs being attached to and supported by said plurality of drive train members;

drive means operably connected with a power source for selective and synchronized longitudinal movement of said drive train members along said guide track means and for moving said canopy frame cover means between said open storage position and said closed covering position;

and means for extending an end portion of said canopy frame cover means to enclose an end portion of said vehicle bed.

The contractible cover assembly for a load carrying body of a vehicle of the present invention advantageously may be mounted to either the longitudinal side surface of a vehicle's horizontal bed floor (e.g. a "flatbed" truck) or to the vertically extending sidewall portions bordering a vehicle bed floor (e.g. a "pick-up" truck). In the former situation, the canopy frame cover means will include canopy frames which have a pair of support legs of a greater length to support the rib portion of the frame which will extend traversely across the width of the load carrying body of a vehicle bed between the laterally spaced guide track means. In the later situation where the contractible cover assembly for a load carrying body of a vehicle is attached to the vertically extending sidewall portions bordering a vehicle bed, the canopy frame cover means may include canopy frames support legs of a lesser dimension such that they are sufficient to extend upwardly over the sidewall portions bordering the truck bed floor to support the rib portion of the frame in a position extending traversely over the cargo load of the vehicle bed. In either situation the contractible cover assembly for a load carrying body of a vehicle of the present invention may be mounted to a vehicle in a "retrofit" manner such as, for example, to take a pre-existing flat bed truck or pickup truck and change the same into a vehicle having a contractible cover assembly for its load carrying body. Thus, it is a significant advantage of the present invention that the contractible vehicle bed covering with extendable closure is an independent assembly which may be retrofitted to pre-existing flat bed trucks, pickup trucks and other vehicles.

A further advantage of the present invention is that the contractible cover assembly can be actuated by a driver in the cab portion of the truck so as to automatically extend the cover means over the cargo area of a vehicle or to automatically contract the cover means back to an open storage position wherein a vehicle bed is substantially uncovered.

Still further, the contractible cover assembly for the load carrying body of a vehicle of the present invention advantageously provides for canopy frame cover means which are attached to and supported by a drive train member of a modular design longitudinally movable along the guide track means. Thus, it is only necessary to add additional drive train members as part of a drive train team to accommodate differing lengths of vehicle beds. Similarly, the means for extending an end portion of the canopy frame cover means to enclose an end portion of a truck bed floor may comprise a closure end train member which is also modular in design.

Still further, the contractible cover assembly of the present invention advantageously provides for means for extending an end portion of the canopy frame cover means to enclose the end portion of a vehicle bed thereby entirely enclosing and securing the cargo of the vehicle bed to prevent dangerous spillage.

Also, the contractible cover assembly of the present invention fosters an ease of movement of the drive train team members along the guide track means as the lower wheels of each of the drive team members communicate with a tensioning member to allow flexion of the lower wheels such that the upper wheels of the drive train members can ride over ice, dirt, or other debris or impediment upon the guide track means.

SUMMARY OF THE INVENTION

According to the present invention there is provided a contractible cover assembly for the load carrying body of a vehicle comprising:

canopy frame cover means for covering a load carrying body of a vehicle bed which is movable between an open storage position wherein the vehicle bed is substantially uncovered and a closed covering position wherein the vehicle bed is closed by the cover means;

laterally spaced guide track means capable of being mounted along the longitudinal side surfaces of a vehicle bed or the vertically extending side wall portions bordering a vehicle bed for supporting the cover means during movement between the open storage position and the closed covering position;

the canopy frame cover means including a plurality of drive train team members longitudinally moveable along the guide track means and a plurality of canopy frames, the frames having a rib portion integral with and bridging a pair of support legs, the rib portion having a length to extend traversely across the width of the load carrying body of a vehicle bed between the laterally spaced guide track means, and the support legs being attached to and supported by the plurality of drive train team members;

drive means operably connected with a power source for selective and synchronized longitudinal movement of the drive train team members along the guide track means and for moving the canopy frame cover means between the open storage position and the closed covering position;

and means for extending an end portion of the canopy frame cover means to enclose an end portion of the vehicle bed.

A contractible cover assembly for the load carrying body of a truck of the present invention will be hereinafter described with reference to drawings of a preferred embodiment thereof, the drawings being illustrative of the best mode known by the inventor for carrying out the invention.

BRIEF DESCRIPTION OF THE DRAWINGS

FIG. 6 is a reverse or inside plan view of the drive train member illustrated at FIG. 5.

FIG. 7 is a side plan view of the closure end train drive member which supports the means for extending an end portion of the canopy frame cover means to enclose an end portion of a vehicle cargo bed and shows an extendable canopy frame support leg in a locked open position.

FIG. 8 is a reverse or inside plan view of the closure end train drive member illustrated at FIG. 7.

DESCRIPTION OF THE PREFERRED EMBODIMENTS

Figure 1A:
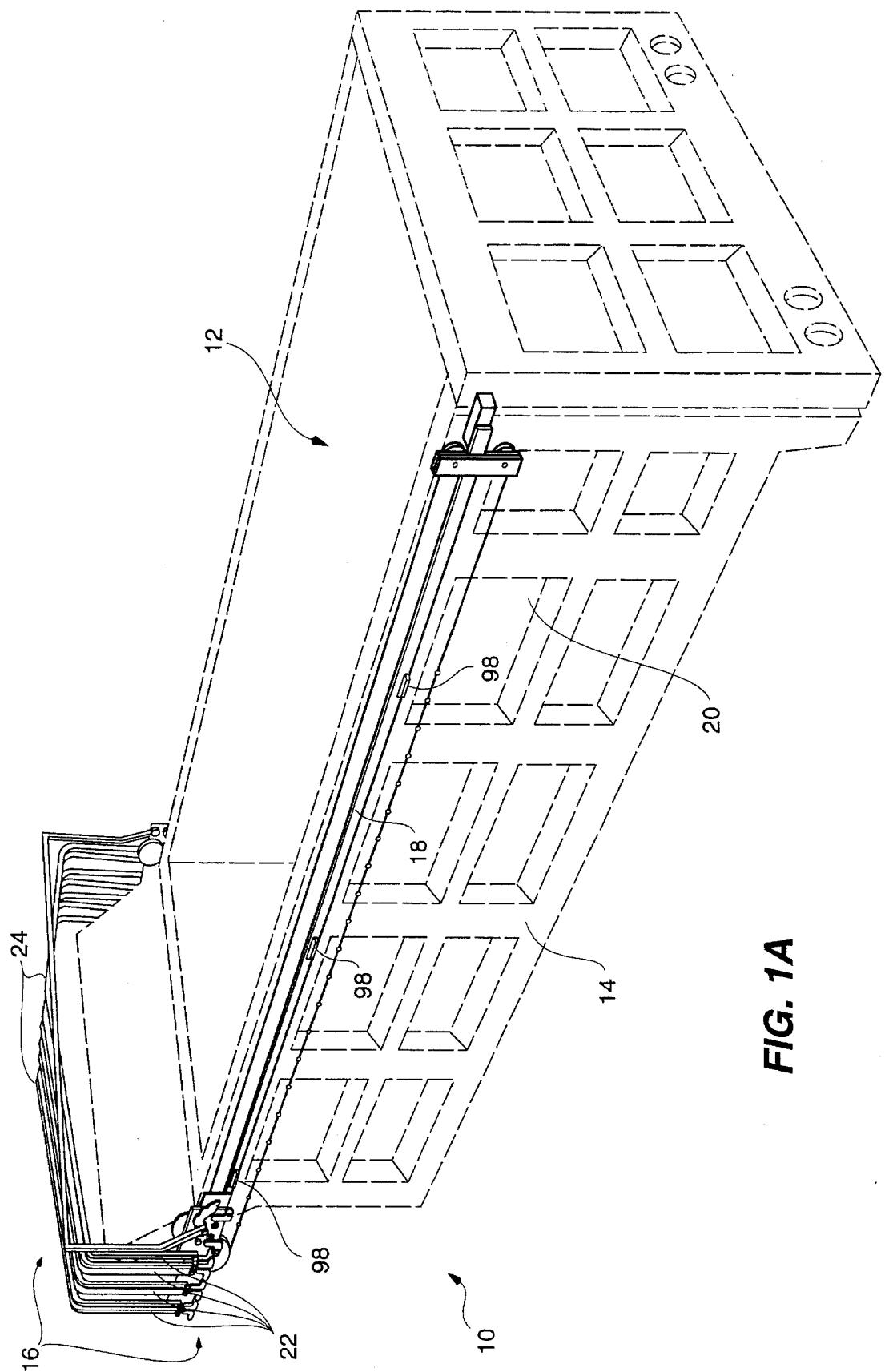
FIG. 1A and 1B are perspective views of the contractible cover assembly for the load carrying body of a vehicle of the present invention wherein the laterally spaced guide track means are mounted either to the sidewall portions of a cargo truck as illustrated in phantom in FIG. 1A or to the longitudinal side surfaces of a vehicle's horizontal floor bed as illustrated in phantom in FIG. 1B, each figure showing the canopy frame cover means in a fully contracted, open storage position wherein the truck cargo bed is substantially uncovered, the tarp supported by the canopy frame means and certain detail of components hereinafter illustrated being not shown for ease of illustration.
Figure 1B:
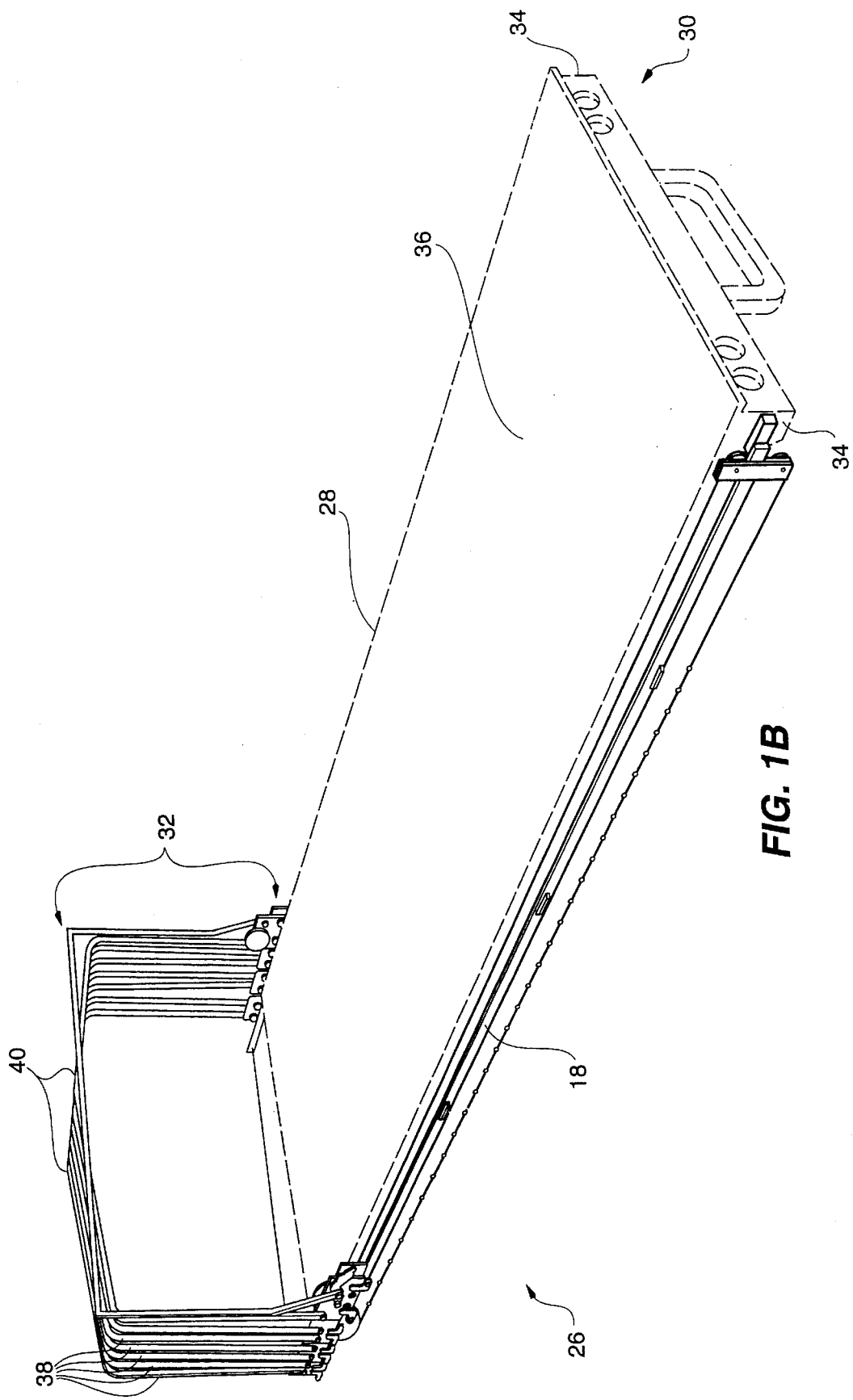

Referring now to the drawings, there is illustrated in FIG. 1A and 1B a side perspective view of a preferred embodiment of the contractible cover assembly for the load carrying body of a vehicle with the canopy frame cover means in a fully contracted open storage position to substantially expose the cargo area either of a cargo truck with side wall portions (shown in phantom in FIG. 1A) or a flat bed truck (shown in phantom in FIG. 1B).

In FIG. 1A contractible cover assembly 10 for the load carrying body 12 of a vehicle 14 includes canopy frame cover means 16 shown in the fully contracted open storage position. Canopy frame cover means 16 are capable of extensible and retractable longitudinal movement along laterally spaced parallel guide track means 18 mounted upon the vertically extending side wall portion 20 bordering each side of the load carrying body 12 of vehicle 14. Canopy frame cover means 16 includes a plurality of canopy frame support legs 22 of sufficient dimension to extend upwardly over the side wall portion 20 of vehicle 14 and to support a corresponding plurality of rib portions 24 integral with and bridging support legs 22.

In FIG. 1B there is illustrated a contractible cover assembly 26 for the load carrying body 28 of a vehicle 30 which includes canopy frame cover means 32 capable of extensible and retractable longitudinal movement upon laterally spaced parallel guide track means 18 now mounted along each longitudinal side surface 34 of a horizontal truck bed floor 36. When canopy frame cover means 32 are attached to guide track means 18 mounted along each longitudinal side surface 34 of a horizontal truck bed floor 36, a plurality of support legs 38 will necessarily be of a greater dimension than support legs 22 illustrated in FIG. 1A so as to extend upwardly from the longitudinal side surface 34 of horizontal truck bed floor 36 to define the cargo area upon horizontal truck bed floor 36. The plurality of support legs 38 are integral with a corresponding plurality of rib portions 40 bridging support legs 38.

FIGS. 1A and 1B illustrate that the contractible cover assembly of the present invention may be mounted along the longitudinal side surface of a horizontal truck bed floor or the vertically extending side wall portion bordering a truck bed floor such that pre-existing vehicles may be retrofitted with the present invention. In this regard, the laterally spaced guide track means of the contractible cover assembly of the present invention are preferably bolted to bolt reception welds 65 welded to a truck or flatbed surface (see for example FIG. 11), but may otherwise be attached by suitable means known in the art, in an aligned manner to form laterally spaced parallel rails affixed to a longitudinal side surface of a truck bed floor or truck sidewalls.

Figure 2:
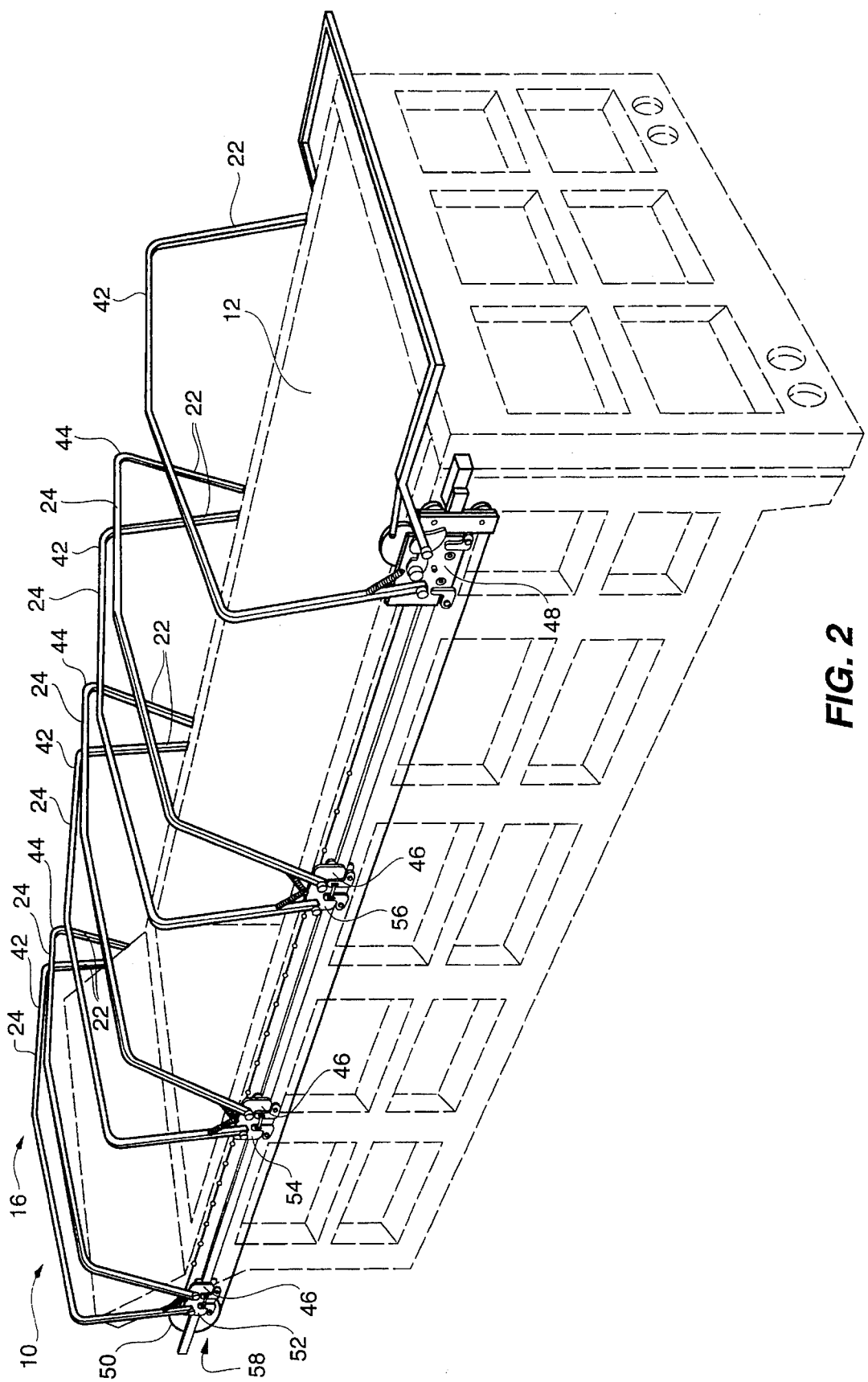
FIG. 2 is a perspective view of the contractible cover assembly for the load carrying body of a vehicle of the present invention similar to FIG. 1A but now showing the canopy frame cover means in a fully extended, closed covering position wherein the truck cargo bed is closed by the cover means.

FIG. 2 illustrates a side perspective view of the contractible cover assembly 10 for the load carrying body 12 of a vehicle but now with the canopy frame cover means 16 in a fully extended, closed covering position wherein the load carrying body 12 is completely closed by cover means 16. In this regard, canopy frame cover means 16 includes a plurality of front canopy frames 42 and rear canopy frames 44 each of which has a rib portion 24 integral with and bridging a pair of support legs 22. Rib portion 24 has a length sufficient to extend traversely across the entire width of load carrying body 12 between the laterally spaced parallel guide track means 18. Each of the support legs 22 is pivotally attached to and supported by either one of a plurality of drive train members 46 or a closure end drive train member 48 all of which are extensibly and retractably longitudinally moveable along the guide track means 18 by drive means 50 which will hereinafter be described in detail. The support legs 22 are capable of limited radial movement. Thus, in FIG. 2 there is illustrated a first drive train member 52, a second drive train member 54, a third drive train member 56, and a closure end drive train member 48, all of which comprise a drive train team 58.

Figure 3:
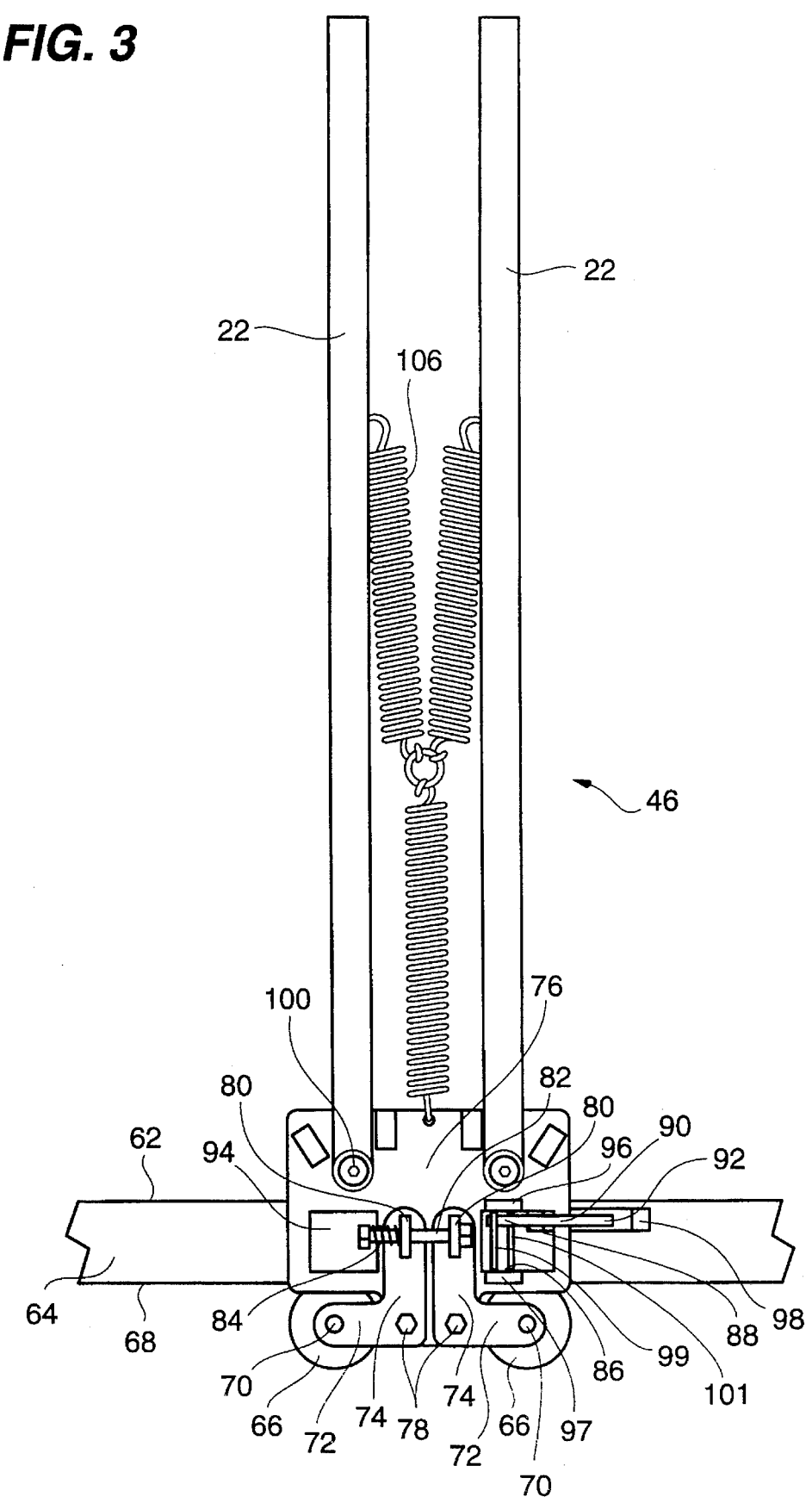
FIG. 3 is a side plan view of a drive train member of the contractible cover assembly for the load carrying body of a vehicle and shows a pair of canopy frame support legs in a upright closed position, said legs pivotably attached to and supported by the drive train member.
Figure 4:
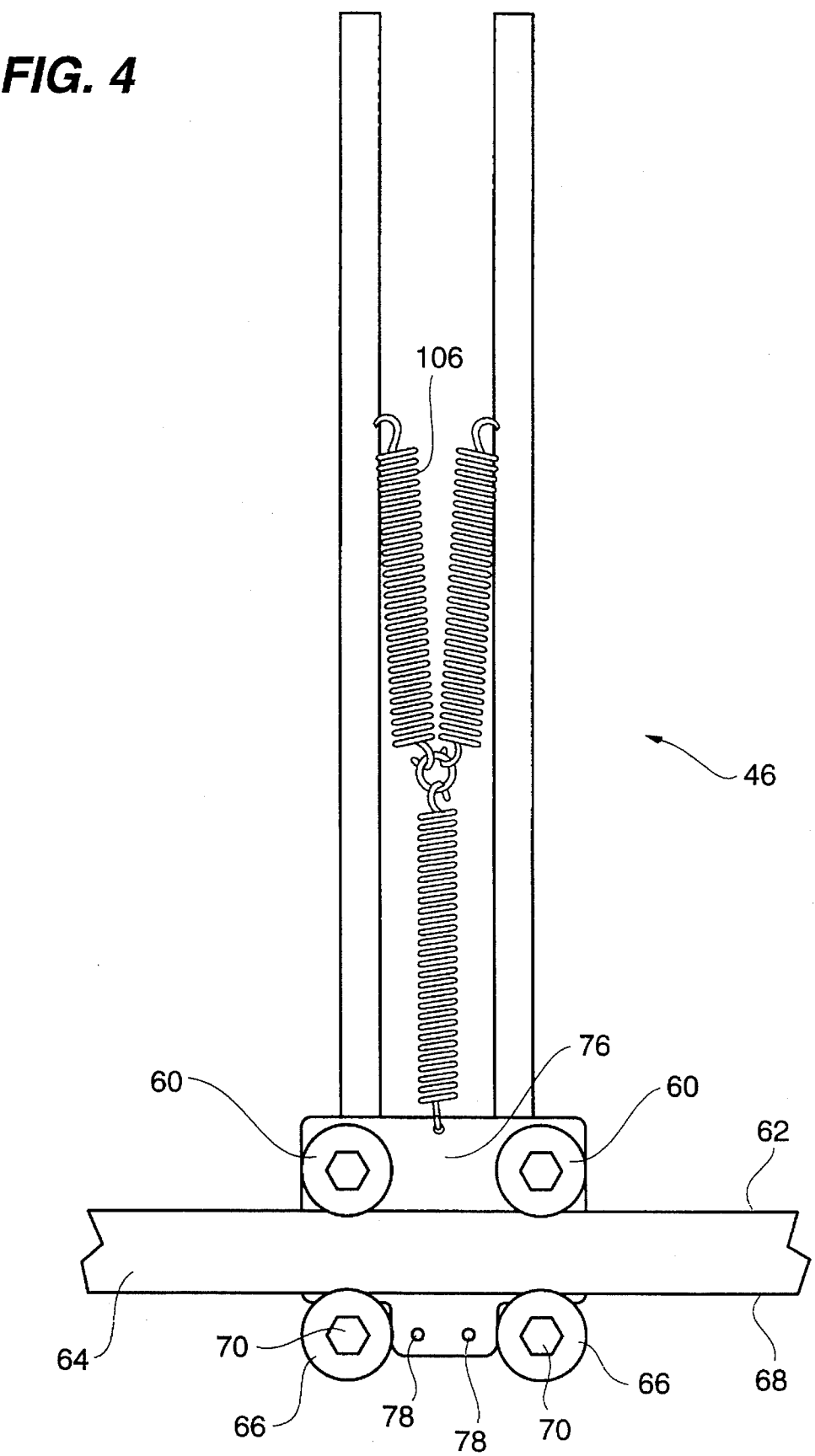
FIG. 4 is a reverse or inside plan view of the drive train member illustrated at FIG. 3 and shows a pair of upper wheels and a pair of lower wheels riding upon a guide rail.

In FIG. 3 there is illustrated a side plan view of a drive train member 46, such as the first drive train member 52, the second drive train member 54 or the third drive train member 56 illustrated at FIG. 2. As best illustrated in the inside or reverse plan view of FIG. 4, drive train member 46 has a pair of upper wheels 60 to ride along the upper surface 62 of guide rail 64, and a pair of lower wheels 66 to ride along the bottom surface 68 of guide rail 64. Guide rail 64 is a suitable embodiment of the laterally spaced parallel means 32. Each of the lower wheels 66 are bolted by an axle bolt 70 to a tension plate 72 integral with a tension member 74 (See FIG. 3). As illustrated in FIGS. 3 and 4, tension members 74 are secured to a main plate 76 of the drive train member 46 by a bolt 78 mounted in a sleeve bearing and a thrust bearing. The tension members 74 at their upper end each include a tension block 80 supportingly enclosing a tension arm 82. Tension arm 82 is mounted within torsion spring 84 and is capable of upward and downward movement within tension blocks 80 thereby giving the drive train member 46 a flexibility while riding along the laterally spaced parallel guide track rail 64. For example, if upper surface 62 of guide rail 64 has ice, snow, mud, dirt, or other impediment thereon then when upper wheels 60 encounter the same, the upper wheel may traverse over the impediment due to flexion of the tension members 74.

Figure 5:
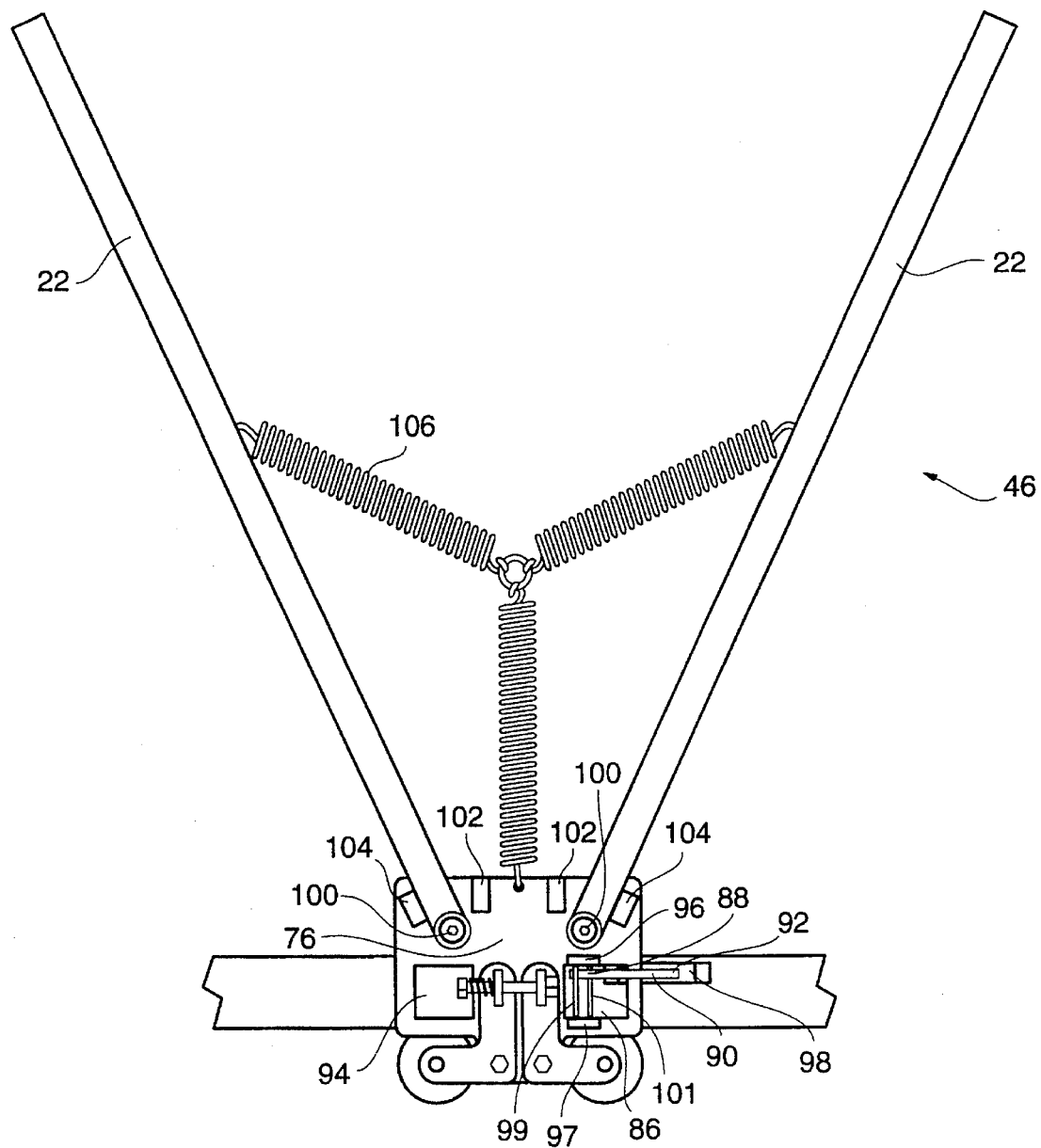
FIG. 5 is a side plan view of the drive train member illustrated at FIG. 3 but now showing the pair of canopy frame support legs outwardly laterally displaced.

In FIGS. 3 and 5, laterally rightwardly adjacent to the tension members 74 is a shoe block 86 which includes upper end 96, lower end 97, proximal bar 99, and distal bar 101 that supports the proximal end 88 of a shoe lock 90. As observed in FIGS. 3 and 5 each drive train member 46 has a reception aperture 94. Likewise, the closure end drive train member has a reception aperture 94 (See FIGS. 7 and 9). Shoe lock 90 has a distal hook end 92 which is capable of a latched engagement with the reception aperture 94 of a forwardly adjacent, neighboring drive train member to thereby join drive train members as part of a drive team. In FIGS. 3 and 5 shoe block 86 supports the proximal end 88 of shoe lock 90 just below shoe block upper end 96 so that shoe lock 90 is aligned with rail ramp 98. For other drive train members 46 forming part of a drive team 58 the supporting connection of the shoe block 86 to the shoe lock 90 can be established further below upper end 96, at a midway point between upper end 96 and lower end 97, further below the midway point, or just above lower end 97 to thereby stagger the placement of other shoe locks 90 with respect to other shoe blocks 86. This staggering of the shoe locks of drive train members will allow a corresponding staggering of rail ramps 98 (see FIG. 1A) along the outside side surface of the laterally spaced parallel guide rail 64 to unlatch the shoe locks of adjoining drive train members at a predetermined point along the guide rails 64 (i.e. at each rail ramp 98) to thereby stagger a plurality of drive train members at the predetermined rail ramp 98 locations.

It is noted that the drive train members 46 may thus be of a modular design, the only differences between drive train members 46 of a drive train team 58 being where along the vertical spacing of shoe block 86 the shoe lock 90 is located.

Referring now to FIG. 5 there is shown a side plan view of the drive train member illustrated at FIG. 3 but now with the canopy frame support legs in an outwardly laterally displayed position. Drive train member 46 at the upper end of main plate 76 supports a pair of canopy frame support legs 22. Each support leg 22 is bolted at its lower end to main plate 76 of the drive train member 46 by shoulder bolt 100 set within a retaining ring and bearing. Canopy frame support legs 22 are capable of limited radial movement within inside bow pivots 102 and outside bow pivots 104, respectively, such that the support legs 22 in combination with Y-shaped spring 106 are capable of achieving an upright position (as illustrated in FIG. 3) or a laterally displayed position (as illustrated in FIG. 5).

As illustrated in FIGS. 1A and 2, the support legs 22 are integral with a rib portions 24 to form front canopy frames 42 and rear canopy frames 44. The lateral displacement of the front and rear canopy frames 42 and 44 relative to one another helps to extend tarp cooperative with such frames. A tarp or other cover may be secured to the canopy frames by tarp ties or the tarp may cooperate with slits cut into the canopy frames or be otherwise secured by means known in the art.

Figure 10:
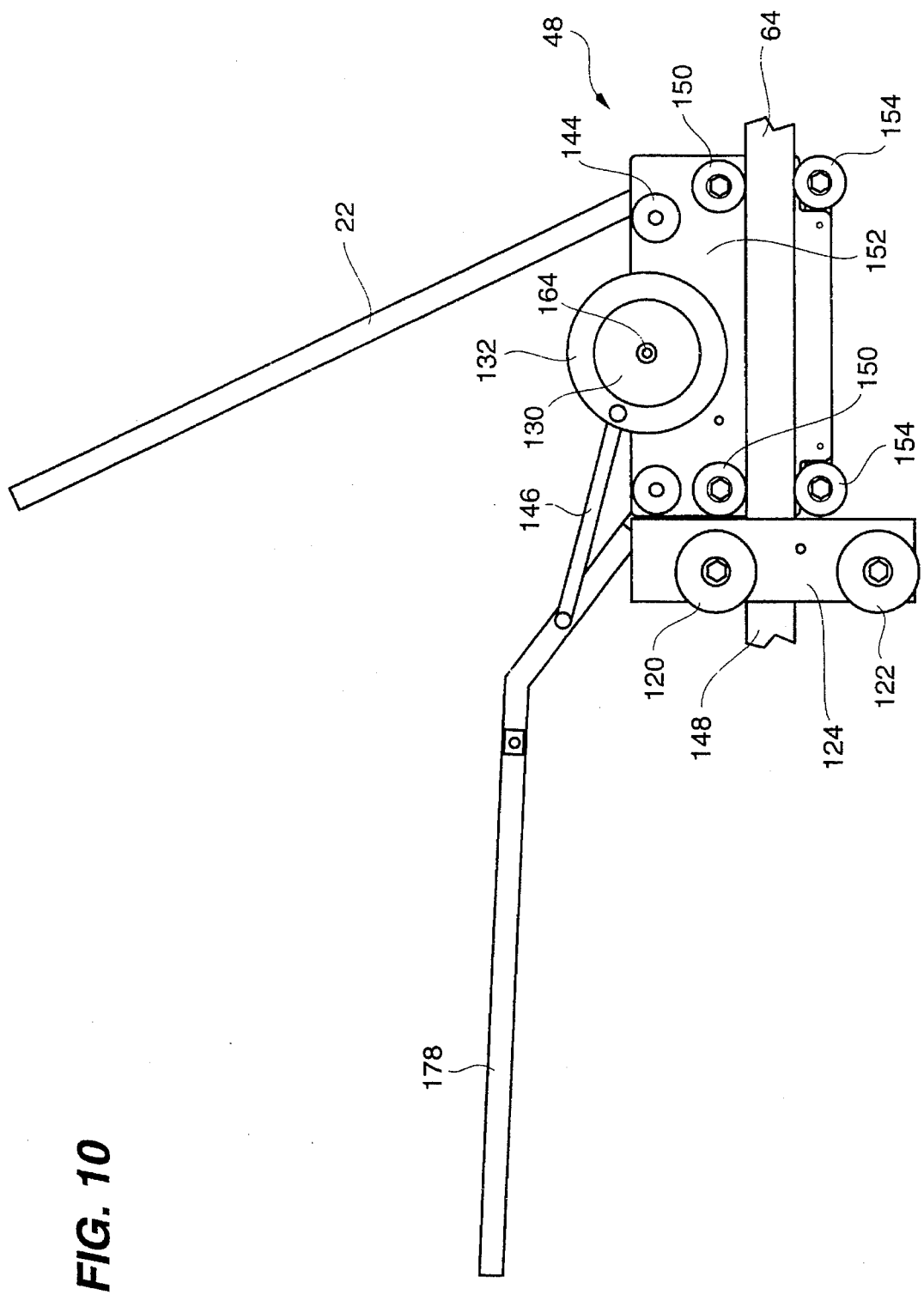
FIG. 10 is a reverse or inside plan view of the closure end train drive member illustrated at FIG. 9.
Figure 12:
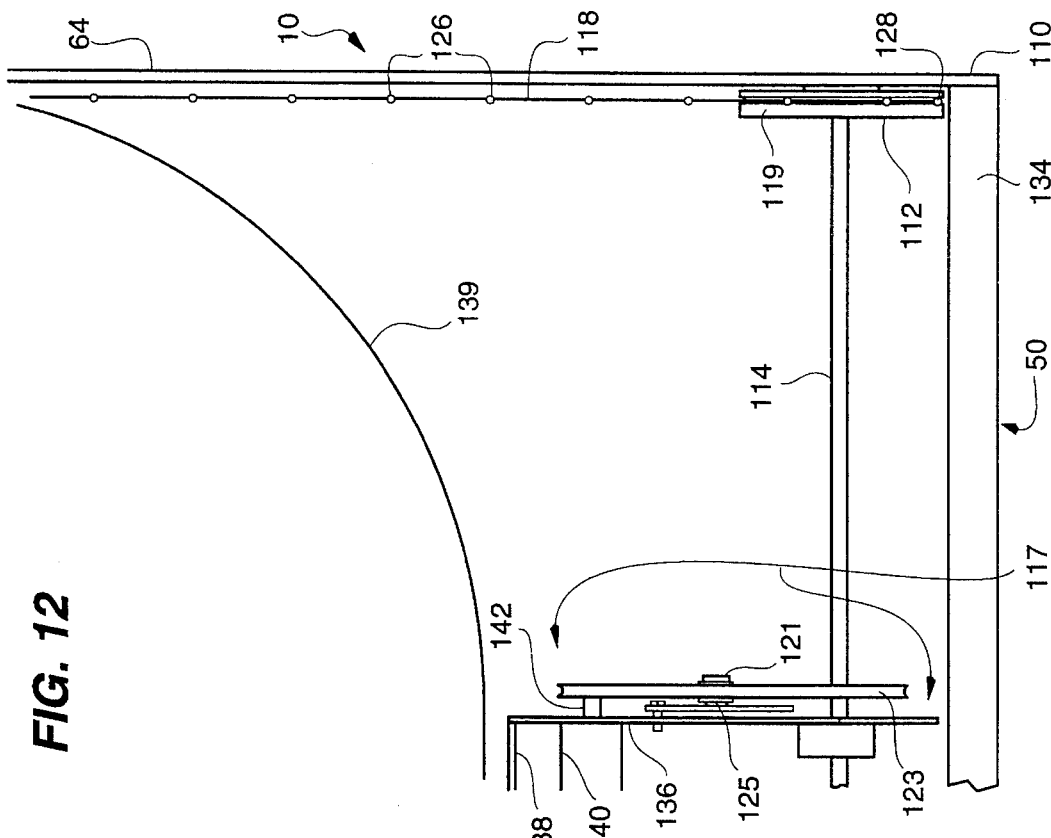
FIG. 12 is an enlarged top plan view of the drive means illustrated at FIG. 11.
Figure 11:
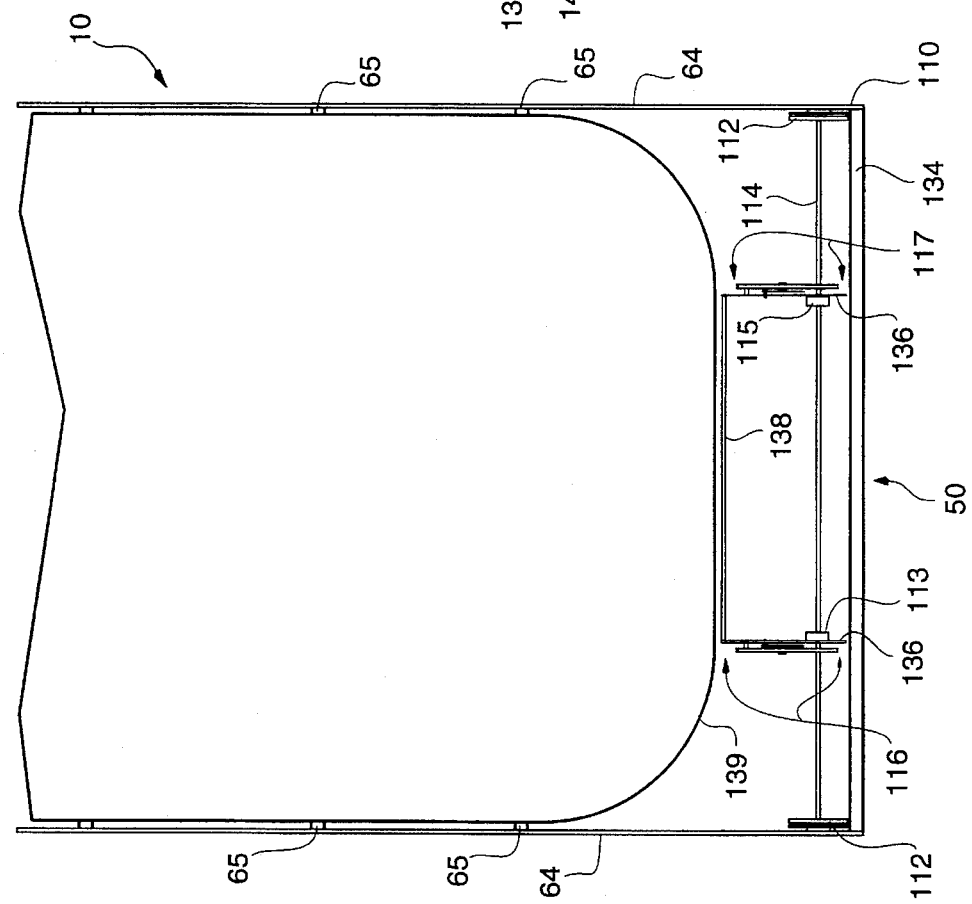
FIG. 11 is a top plan view of the drive means of the contractible cover assembly for the load carrying body of a vehicle shown in FIG. 2, the drive means being located at a proximal end of the laterally spaced guide track means for movement of a cable cooperative with a drive wheel and the means for extending an end portion of the canopy frame cover means to enclose an end portion of the truck bed floor.

As illustrated in FIGS. 11 and 12 the contractible cover assembly 10 includes drive means 50 located at the proximal end 110 of laterally spaced parallel guide rails 64. In FIG. 11 the drive means 50 includes drive wheels 112 set upon drive shaft 114 which is centrally connected to drive hubs 113 and 115 of drive hub assemblies 116 and 117 respectively. Drive hub assemblies 116 and 117 are operatively connected to a suitable power source such as motor 121 for movement of drive hubs 113 and 115 respectively to rotate drive wheels 112. Alternatively, a single drive hub assembly, such as drive hub assembly 117 enlarged in FIG. 12 may drive drive wheels 112. Drive hub assemblies 116 and 117 may include a chain drive member 123 operatively connected to motor 121 and torque limiter 125 or may comprise a drive wheel power supply known in the art. In FIG. 12, centered within the outer annular periphery 119 of drive wheel 112 is cable 118. Cables 118 engage around drive wheels 112 and extend longitudinally around the upper tension wheel 120 and lower tension wheel 122 of rail blocks 124 (illustrated at FIG. 10) of each of the laterally spaced guide rails 64. Thus, drive wheels 112 and the upper tension wheel 120 and lower tension wheel 122 of rail blocks 124 form the outer borders of cable loops. Cable 118 may be provided with a plurality of cable beads 126 staggered among a proximal end portion of the cable in an arrangement to be cooperatively set into a plurality of bead reception apertures 128 at the outer annular periphery 118 of drive wheel 112 when the cable encounters the drive wheel. Beading of the proximal end portion of the cable for cooperation with the bead reception apertures 128 of drive wheels 112 provides for a synchronization of cable movement and thereby synchronization of movement of drive train members on each of the laterally spaced guide rails 64. As observed in FIGS. 1A and 2, cable 118 is beaded only at a proximal portion of the cable loop to ensure that beads 126 do not interfere with closure end train member 48. If cable 118 is not an integral loop, the two ends of cable 118 may be secured within the inside facing surface 130 of trip wheel 132 by suitable means such as cable end clamps (See FIG. 10).

As observed in FIG. 11, guide rails 64 terminate at their proximal end 110 into width bar 134. Width bar 134 serves as structure to support guide rails 64 and may be joined to support arms 136 extending outwardly therefrom. Support arms 136 terminate into mounting bar 138 which may be secured by suitable means known in the art to a proximal vehicle bed end 139. As illustrated in FIG. 12 support arms 136 may also serve as a support structure for a tarp bar anchor 140 which preferably has nut and bolt connection 142 at one end of the tarp bar anchor 140 to provide access to an edge fold of tarp to lace and secure the tarp within tarp bar anchor 140.

The upper band of cable 118 interacts with closure end train member 48 illustrated at FIGS. 7 through 10. In this regard and now referring to FIG. 10, cable 118 longitudinally extends from the drive wheel 112 to proximal tension wheel 144 where it is then directed upward to trip wheel 132 before being directed downward to distal tension wheel 146. Cable 118 then travels from distal tension wheel 146 to upper tension wheel 120 and lower tension wheel 122 of rail block 124 before being directed back to drive wheel 112 to complete a cable loop.

Trip wheel 132 of closure end train member 48 is illustrated in FIGS. 7 and 8 in a locked position such that movement of cable 118 by the drive means 50 will force movement of the closure end train member 48 laterally from the proximal end 110 of the laterally spaced guide rails 64 to the distal end 148 of the laterally spaced guide rails 64. Movement of the closure end train member 48 will likewise cause longitudinal movement of the first drive train member 52, second drive train member 54, and third drive train member 56 (and as many drive train members 46 as are members of the drive train team 58) from the proximal end 110 of the laterally spaced parallel guide rails 64 toward its distal end 148 for selective and synchronized longitudinal movement of all drive train members along the guide track means and for moving the canopy frame cover means 16 or 26 between the open storage position and the closed covering position. As previously noted all drive train members 46 of a drive train team 58 are linked to their neighbor drive train member or closure end train member 48 by a latched engagement of the distal lock end 92 of shoe lock 90 within reception aperture 94 of the neighbor drive train member 46 or closure end train member 48. The laterally spaced parallel guide rails 64 have staggered on their outer side surface a plurality of rail ramps 98 corresponding to the location of the shoe locks 90 on each drive train member 46 such that when a shoe lock 90 contacts the rail ramp 98 the shoe lock 90 will ride upward on the rail ramp and unlatch the drive train member 46 from the drive train team thereby staggering in a predetermined placement the canopy frame cover means 16 or 26.

Referring now to FIGS. 7 and 8 there is illustrated the closure end train member 48 with the extendable cover means in an upright locked position. The closure end train member 48 is different than other drive train members 46. As best illustrated in FIG. 8, closure end train member 48, similar to other drive train members, has a pair of upper wheels 150 attached to main plate 152 and a pair of lower wheels 154 mounted to a tension plate 156 by axle bolt 158. As observed in FIG. 7 adjacent to the inside of each lower wheel 154 is a tension plate 156 which is integral with tension member 160 having a first tension block 162 mounted at an upper portion of tension member 160. A second tension block 163 mounted on main plate 152 cooperates with the first tension block 162 of tension member 160 of each lower wheel 154 to enclose a bolt 164 in a sleeve bearing which is capable of a limited upward and downward movement within tension blocks 162 and 163 thereby providing a flexibility to closure end train member 48 as it rides along the guide rails 64 since if upper wheels 150 of closure end train member 48 encounters ice, dirt, or other impediment upon the top surface of guide rails 64, the upper wheels may traverse the impediment due to flexion of tension members 160.

As illustrated in FIGS. 8 and 10, unlike other drive train members 46, the closure end train member 48 has a proximal tension wheel 144 and a distal tension wheel 146 and a trip wheel 132 therebetween. Trip wheel 132 is mounted to main plate 152 of closure end train member 48 by means of shoulder bolt 164 within a sleeve bearing. Lock plate 166 is affixed to a trip, wheel 132 by shoulder bolt 168 within a sleeve bearing at a proximal portion 170 of lock plate 166. Also connected to trip wheel 132 is control arm 172 interconnecting trip wheel 132 to an upper portion 174 of rear stub arm 176. Rear stub arm 176 at its upper end 180 is integral with an extensible canopy support arm 178 and at its lower end 184 is connected to main plate 152 by bolt 182 within a sleeve bearing.

Figure 9:
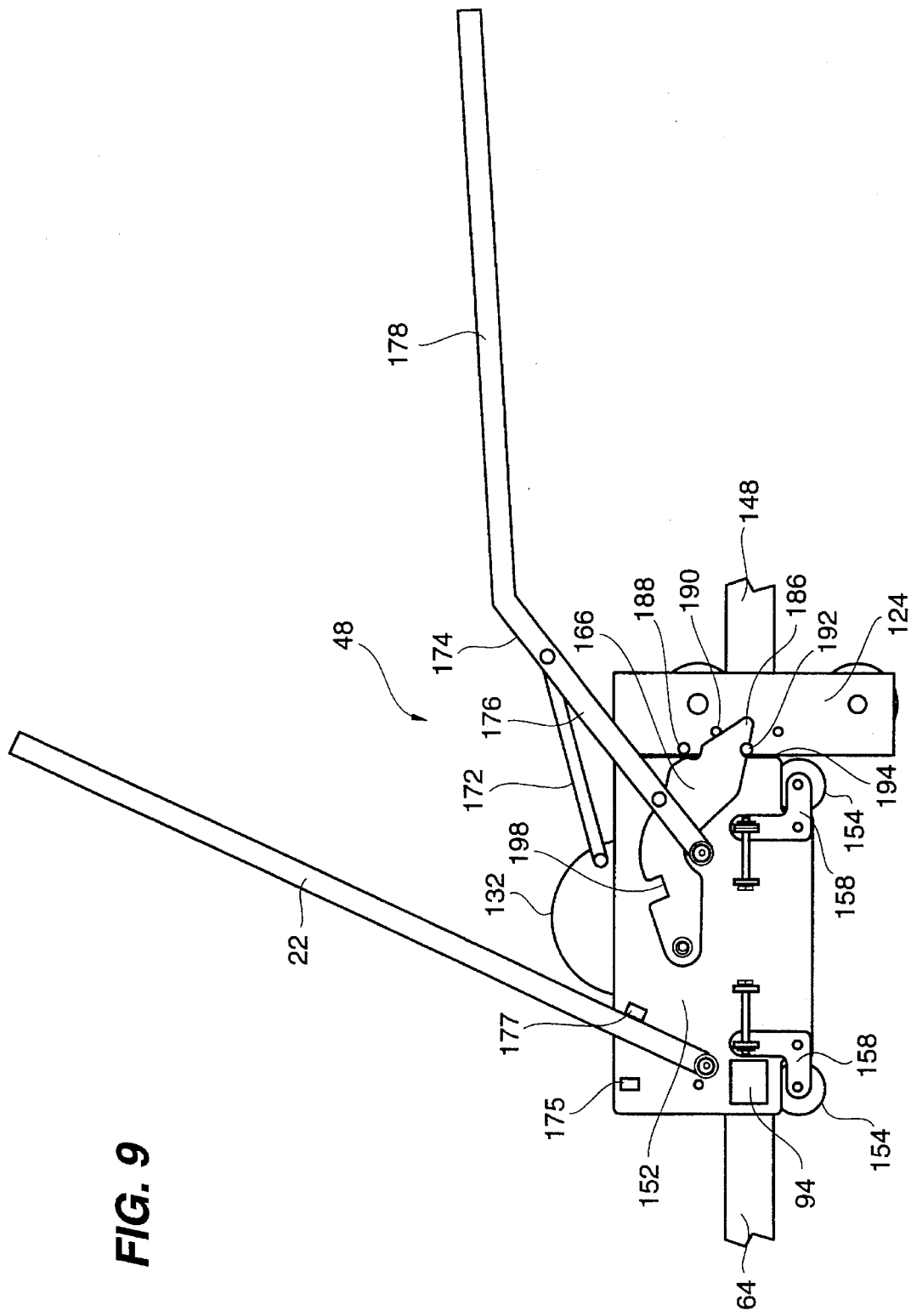
FIG. 9 is a side plan view of the closure end train drive member similar to FIG. 7 but now showing the extendable canopy frame support leg in an extended locked closed position to enclose the end portion of a truck bed floor.

Referring now to FIG. 9, as closure end train member 48 approaches rail block 124 it separates from the third drive train member 56 when shoe lock 90 of the third drive train member contacts its corresponding rail ramp 98 to unlatch its shoe lock 90 from the reception aperture 94 of closure end train member. Closure end train member 48 then travels along the laterally spaced parallel guide rails 64 until it first contacts rail block 124 with a distal end 186 of lock plate 166. In this regard, the distal end 186 of lock plate 166 will contact the lower edge of upper rear rail stop pin 188 forcing the lock plate 166 in a downwardly direction until its distal end 186 contacts the lower edge of intermediate rear rail stop pin 190 which further forces the lock plate 166 downward until lower rear rail stop pin 192 sets within receiving notch 194 of the lock plate 166. Once the lock plate has achieved this position, lock pin 196 (see FIG. 7) of rear stub control arm 176 which is interconnected with trip wheel 132 is freed from its locked position within lock groove 198 of lock plate 166 (see FIG. 9) thereby causing trip wheel 132 to likewise be freed of its locked condition wherein it is not capable of rotational movement to an unlocked condition where it is capable of rotational movement causing control arm 172 and rear stub arm 176 to rotate forwardly. The forward movement of the control arm 172 and rear stub arm 176 extends forwardly the end portion of the canopy frame cover means, namely extensible canopy support arm 178 and its bridging rib 200, to thereby enclose an end portion of a truck bed floor (see FIG. 2). Forward extension of canopy support arm 178 will, due to tarp interconnection with closure end train support arm 22, laterally display support arm 22 which is pivotable between proximal closure end train bow pivot 175 and distal closure end train bow pivot 177.

The above description of movement of the contractible cover assembly from a fully contracted open storage position to a fully extended closed covering position can be reversed by a counterclockwise movement of the drive means so as to drive cable 118 in a reverse direction whereby the contractible cover assembly moves from the fully extracted closed covering position back to the fully contracted open storage position.

It is understood that the foregoing description with respect to one side of the contractible cover assembly of the present invention will also serve as a sufficient description of the opposing side thereof as the opposing side is a mirror image of the described side.

From the foregoing description, it will be apparent that the contractible vehicle bed covering with extendable closure of the present invention has a number of advantages, some of which have been described above and others of which are inherent in the invention. Furthermore, modifications can be made to the present invention without departing from the teachings thereof. Accordingly, the scope of the invention is only to be limited as necessitated by the accompanying claims.

I claim:

1. A contractible cover assembly for the load carrying body of a vehicle comprising:

canopy frame cover means for covering a load carrying body of a vehicle bed which is movable between an open storage position wherein the vehicle bed is substantially uncovered and a closed covering position wherein the vehicle bed is closed by the cover means;

laterally spaced guide track means capable of being mounted along the longitudinal side surfaces of a vehicle bed or the vertically extending side wall portions bordering a vehicle bed for supporting said cover means during movement between said open storage position and said closed covering position;

said canopy frame cover means including a plurality of drive train team members longitudinally movable along said guide track means and a plurality of canopy frames, said frames having a rib portion integral with and bridging a pair of support legs, said rib portion having a length to extend traversely across the width of said load carrying body of a vehicle bed between said laterally spaced guide track means, and said support legs being attached to and supported by said plurality of drive train team members;

drive means operably connected with a power source for selective and synchronized longitudinal movement of said drive train team members along said guide track means and for moving said canopy frame cover means between said open storage position and said closed covering position;

at least one of said drive train team members including a closure end train member longitudinally movable along said guide track means having a main plate and a trip wheel mounted to said main plate capable of achieving a locked condition wherein the trip wheel is not capable of rotational movement and an unlocked condition wherein the trip wheel is capable of rotational movement to extend an end portion of the canopy frame cover means to enclose an end portion of said vehicle bed.

2. The contractible cover assembly of claim 1 wherein said plurality of canopy frames supports a tarp or other cover.

3. The contractible cover assembly of claim 1 wherein said laterally spaced guide track means comprises guide rails parallel to each other.

4. The contractible cover assembly of claim 1 wherein said drive means comprises a drive wheel operative to move a cable cooperative with said drive wheel and outer border wheels.

5. The contractible cover assembly of claim 1 wherein the closure end train member further includes a lock plate mounted upon said main plate which is operatively connected to an extensible canopy support arm, said extensible canopy support arm being interconnected to said trip wheel by a control arm, said lock plate being cooperative with a rail stop to either lock or free a lock pin cooperative with said trip wheel to thereby control rotational movement of said trip wheel.

6. The contractible cover assembly of claim 1 wherein the support legs of the canopy frames are pivotally attached to and supported by said plurality of drive train team members.

7. The contractible cover assembly of claim 1 wherein said plurality of drive train team members further includes a pair of upper wheels and a pair of lower wheels capable of movement along the laterally spaced guide means.

8. The contractible cover assembly of claim 7 wherein said plurality of drive train team members further includes a tension member communicating with said lower wheels to allow flexion of said lower wheels.

9. The contractible cover assembly of claim 1 wherein some of said plurality of drive train team members further includes a shoe lock having a proximal end and a distal end, said proximal end being attached to said drive train team and said distal end being capable of a latched engagement with a reception aperture of an adjoining drive train team member or a closure end train member.

10. The contractible cover assembly of claim 9 wherein each of said shoe locks are capable of being unlatched from said reception aperture of an adjoining drive train team member or a closure end train member by a corresponding rail ramp located on said laterally spaced parallel guide track means to thereby separate drive train members from one another.

11. The contractible cover assembly of claim 10 wherein said rail ramps are staggered along the vertical side surface of the laterally spaced guide track means to thereby unlatch its corresponding shoe lock and thereby stagger the plurality of drive train members in a predetermined position with respect to said laterally spaced guide track means.

12. The contractible cover assembly of claim 4 wherein said drive means further includes a torque limiter operatively connected to interact with said drive wheel to prevent rotation of said drive wheel.

* * * * *